United States Patent [19]

Nakamura et al.

[11] Patent Number: 4,926,049
[45] Date of Patent: May 15, 1990

[54] REFLECTION TYPE PHOTOELECTRIC SWITCH

[75] Inventors: Arata Nakamura, Hazukashi; Norio Onji, Uji, both of Japan

[73] Assignee: Omron Tateisi Electronics Company, Kyoto, Japan

[21] Appl. No.: 344,558

[22] Filed: Apr. 26, 1989

Related U.S. Application Data

[63] Continuation of Ser. No. 55,286, May 29, 1987, abandoned.

[30] Foreign Application Priority Data

Jun. 2, 1986 [JP] Japan ................................. 61-128971

[51] Int. Cl.$^5$ .............................................. G01N 21/86
[52] U.S. Cl. ...................................... 250/548; 250/561
[58] Field of Search ...................... 250/209, 221, 222.1, 250/548, 557, 560, 561

[56] References Cited

U.S. PATENT DOCUMENTS

| | | | |
|---|---|---|---|
| 3,423,597 | 1/1969 | Delp ..................................... | 250/231 |
| 3,644,739 | 2/1972 | Wilkinson et al. ................... | 250/209 |
| 3,723,748 | 3/1973 | Coburn et al. ........................ | 250/233 |
| 4,142,105 | 2/1979 | Erdman ................................. | 250/209 |
| 4,683,380 | 7/1987 | Shipkowski et al. ................. | 250/557 |

FOREIGN PATENT DOCUMENTS 1960073 11/1968 Fed. Rep. of Germany .

OTHER PUBLICATIONS

Patent Abstracts of Japan, vol. 10, No. 237 (P-487) [2293], Aug. 15, 1986; & JP-A 6170 404 (TOYO KIKAI K.K.) 11-04-1986 Abstract.
Patent Abstracts of Japan, vol. 8, No. 254 (P-315) [1691], Nov. 21, 1984; & JP-A-59 125 018 (MATSUSHITA DENKO K.K.) 19-07-1984 Abstract.

*Primary Examiner*—David C. Nelms
*Assistant Examiner*—Khaled Shami
*Attorney, Agent, or Firm*—Foley & Lardner, Schwartz, Jeffery, Schwaab, Mack, Blumenthal & Evans

[57] ABSTRACT

A reflection type photoelectric switch adapted to project light to an object to be detected and sense the object on the basis of reflected light therefrom, which comprises a split-type composite light receiving unit consisting of two light receiving segments, a differential amplifer receiving the outputs of the two light receiving segments, and a waveform shaping device for discriminating the differential amplification output of the differential amplifier with a predetermined level and generating a detection output for the object.

7 Claims, 2 Drawing Sheets

FIG. 1
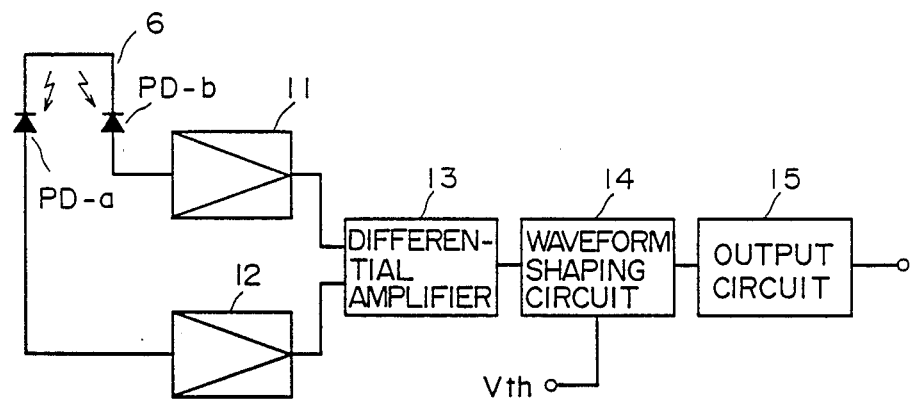
FIG. 3a PD-a OUTPUT SIGNAL 
FIG. 3b PD-b OUTPUT SIGNAL 
FIG. 3c DIFFERENTIAL AMPLIFIER 13 OUTPUT 
FIG. 3d WAVEFORM SHAPING CIRCUIT 14 OUTPUT 

REFLECTION TYPE PHOTOELECTRIC SWITCH

This application is a continuation of application Ser. No. 55,286, filed May 29, 1987, now abandoned.

BACKGROUND OF THE INVENTION

1. FIELD OF THE INVENTION

This invention relates to a reflection type photoelectric switch. More particularly, this invention relates to a reflection type photoelectric switch adated to detect markings on a sheet or the like which is driven by a roller device, for instance.

2. DESCRIPTION OF THE PRIOR ART

In the conventional photoelectric switch of the reflection type for detection of markings on a sheet, a condenser lens is used to focus a light beam from a light emitting element in a predetermined position on the sheet and a marking on the sheet is detected from a change in the level of reflected light. Since the reflected light level is changed by delicate displacement of the sheet in the direction of an optical axis, such as conventional reflection type photoelectrical switch is liable to detect a marking in a false position. To overcome this drawback, there has been proposed a mark sensor wherein two distinct light beams are projected to different positions on the sheet and a marking on the sheet is detected in the differences from the respective reflected light levels. However, such a technique has the disadvantage that the construction of the optical system is complicated.

OBJECTS OF THE INVENTION

It is therefore an object of the invention to provide a photoelectric switch which is capable of detecting markings on a sheet accurately even if the sheet to be detected is displaced somewhat in the direction of the projection light axis.

SUMMARY OF THE INVENTION

The photoelectric switch according to this invention comprises a light receiving means having two distinct light receiving segments and detects the marking of a reflective object on the basis of the output of a differential amplifier. Since in this arrangement the outputs of the respective light receiving segments both vary when the sheet to be detected is displaced in the direction of optical axis, the change is offset in the differential amplifier, with the result that markings on the sheet can be accurately detected without fail.

BRIEF DESCRIPTION OF THE DRAWINGS

FIG. 1 is a block diagram showing the construction of an embodiment of the photoelectric switch according to this invention;

FIG. 3 is a time chart showing changes in signal level in various parts of the photoelectric switch according to the movement of a sheet.

DESCRIPTION OF THE PREFERRED EMBODIMENTS

Figure 2:
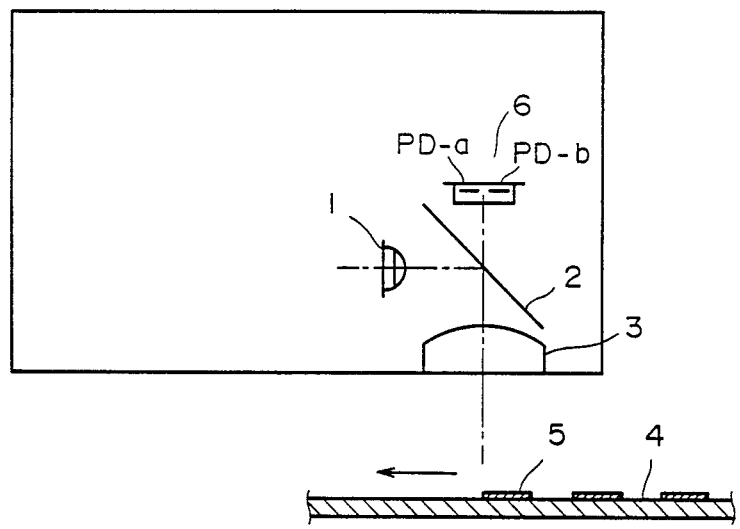
FIG. 2 is a schematic view showing its optical system.

Referring to FIG. 1 which illustrates one embodiment of the invention, the reflection type photoelectric switch comprises a light receiving means consisting of two light receiving units 11, 12, a differential amplifier 13 to which the outputs of the respective light receiving units 11, 12 are applied, a waveform shaping circuit 14 for discriminating the output of the differential amplifier with a predetermined level, and an output circuit. In FIG. 2 which shows the optical system of the same photoelectric switch, a light source 1, which may, for example, be a light emitting diode, is positioned in the focusing position of a condenser lens 3 with the interposition of a half mirror 2. The condenser lens 3 condenses the light from the light emitting diode 1 and projects it to the surface of a sheet 4 which is driven in a direction perpendicular to the optical axis. The sheet 4 is provided with markings 5 at predetermined spaced intervals and the optical system is so disposed that the markings come into the focusing position of the condensor lens 3. The reflected light from the sheet 4 passes through the condenser lens 3 and reaches the half mirror 2, where a portion of the reflected light passes through the half mirror 2 and is incident on a composite photodiode 6. The composite photodiode 6 consists of two photodiodes PD-a and PD-b which have the same light receiving area.

Referring to the block diagram of the photoelectric switch in FIG. 1, the photodiodes PD-a and PD-b of the composite photodiode 6 are fed to amplifiers 11 and 12, respectively. The amplifiers 11 and 12 amplify these outputs with a predetermined amplification factor and the resultant outputs are fed to the differential amplifier 13. The differential amplifier 13 amplifies the difference between the outputs of the two amplifiers 11 and 12 and the output of this differential amplifier is fed to the waveform shaping circuit 14. The waveform shaping circuit is provided with a predetermined threshold level $V_{th}$ and when the threshold is exceeded, the detection output is outputted through the output circuit 15.

The operation of the photoelectric switch according to this embodiment is described below with reference to FIGS. 2 and 3. The light beam from the photodiode 1 which is incident on the sheet 4 hits the marking 5 as the sheet 4 travels, the projection image passes the composite photodiode 6 through the condenser lens 3 and half mirror 2. As shown, as the marking 5 on the sheet 4 is shifted in the direction of division of the photodiode 6, for example in the direction of the arrowmark from the right-hand side, the image of the marking 5 is laterally reversed so that the level of light incident on photodiode PD-a is first altered and then the level of light incident on photodiode PD-b is then altered. Therefore, light reception signals as shown in FIG. 3 (a) and (b) are obtained from the two amplifiers 11 and 12, respectively. As these signals are applied to the differential amplifier 13, this amplifier 13 generates a differential amplification output as shown in FIG. 3 (c). This output is discriminated with the predetermined threshold level $V_{th}$ and, as a result, a detection signal for marking 5 is obtained from the waveform shaping circuit 14 as shown in FIG. 3 (d).

When the focusing position of the condenser lens 3 is traversed by the marking 5 on the sheet 4, it may happen that the sheet 4 is displaced in the direction of the optical axis to alter the distance from the center of the marking. In this case, the image of marking 5 on the photodiode 2 is distorted so that a decrease in the output level occurs. Therefore, the output level of the differential amplifier is also varied but as long as the level is over the threshold $V_{th}$ applied to the waveform shaping circuit 14, a detection signal for marking 5 can be outputted. This means that when the amplitude of the differential output is sufficiently large, a detection signal for marking 5 on sheet 4 can be obtained even if the sheet 4 is displaced in the direction of the optical axis.

Figure 4:
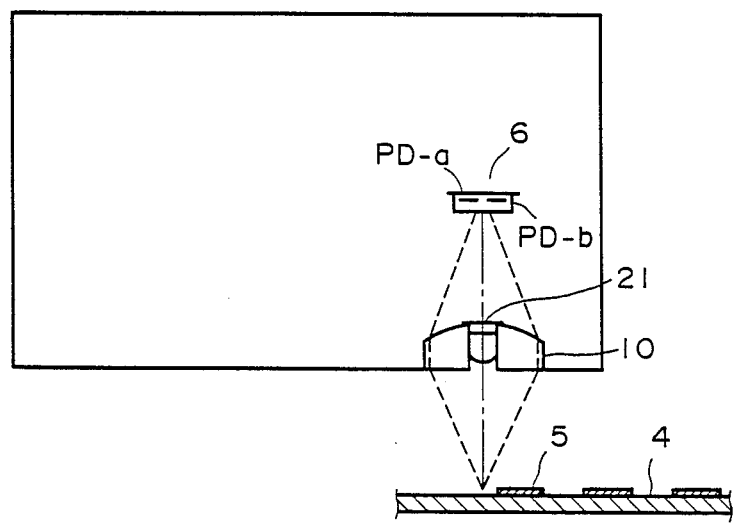
FIG. 4 is a schematic view showing the optical system of a second embodiment of the invention.

Referring to FIG. 4 which shows the optical system of a photoelectric switch according to a second embodiment of this invention, a light emitting diode 21 embedded in the center of a condenser lens 20 is used as a light source. In the position where the reflected light from marking 5 is received along the optical axis, a split-type composite photodiode 6 similar to that used in the preceding embodiment is provided. In this second embodiment, too, the outputs of photodiodes PD-a and PD-b are amplified and fed to a differential amplifier 13 for detection of marking 5 on the sheet 4. This arrangement dispenses with a half mirror so that the optical system is simplified.

While both of the above embodiments were explained with reference to the use of the light source 1 which emits continuous light, it is possible to drive the light emitting diode in pulses. In this case, the reflected light from the marking can be amplified and processed by opening a gate at driving. Such an arrangement helps eliminate noise due to external light to thereby reduce the possibility of false operation to a substantial extent.

It should also be understood that many other changes and modifications may be easily made by one skilled in the art without departing from the spirit and scope of the invention.

What is claimed is:

1. A reflection type photoelectric switch adapted to project light to an object to be detected and to sense the object on the basis of reflected light therefrom, comprising a split-type composite light receiving means having two light receiving segments, a differential amplifier receiving the outputs of said two light receiving segments, and a single threshold waveform shaping means directly connected to said differential amplifier for discriminating the differential amplification output of said differential amplifier with a single predetermined level and generating a single detection output for said object.

2. A photoelectric switch according to claim 1 wherein said light receiving means comprises a composite light receiving element having equal light receiving areas.

3. A reflective type photoelectric switch adapted to project light to an object to be detected and to sense the object on the basis of light reflected therefrom comprising:
    a light source;
    means for reflecting light from said light source to a light condensing means, said light condensing means projecting light onto said object to be detected;
    a split-type composite light receiving means having two light receiving segments for receiving light from said object to be detected, said light receiving segments being disposed to receive light reflected from said object in a predetermined sequence;
    a differential amplifier having two inputs and a single output, each of said inputs connected to one of said light receiving segments, said differential amplifier output being connected directly to a single threshold waveform shaping means; and
    said waveform shaping means generating a single detection output when said differential amplifier output crosses a predetermined said said single threshold level.

4. A reflection type photoelectrical switch adapted to project light to an object to be detected and to sense the object on the basis of light reflected therefrom comprising:
    a light source embedded between portions of a condensing lens, said light source projecting light onto an object to be detected;
    said light condensing lens portions receiving light reflected from said object to be detected and focusing said received light onto light receiving segments of a split-type composite light receiving means, said light receiving segments being disposed to receive said reflected light in a predetermined sequence;
    a differential amplifier having two inputs and a single output, each of said inputs connected to one of said light receiving segments, said differential amplifier output connected directly to a single threshold waveform shaping means; and
    said waveform shaping means generating a single detection output when said differential amplifier output crosses a predetermined said single threshold level.

5. A method of photoelectrically detecting an object comprising the steps of:
    focusing light from a light source onto a location where an object is to be detected;
    moving said object across the location where said light is focussed;
    sequentially detecting light reflected from said object with two light receiving segments of a split-type composite light receiving means and producing a corresponding segment signal from each light receiving segment;
    determining a difference between said segment signals and directly feeding said difference to a single threshold detection means; and
    generating a single detection output when said difference between said segment signals crosses a single predetermined threshold.

6. The method of claim 5 comprising:
    reflecting light from said light source through a light condensing means to focus said light onto said object to be detected;
    providing each of said segment signals to an input of a differential amplifier having a single output;
    generating said detection output from said single differential amplifier output.

7. The method of claim 5 comprising:
    embedding said light source between portions of a light condenser lens:
    directing said light reflected from said object through said portions of said light condenser lens onto said light receiving segments;
    providing each of said segment signals to an input of a differential amplifier having a single output; and
    generating said detection output from said single differential amplifier output.

* * * * *